Figure 1:
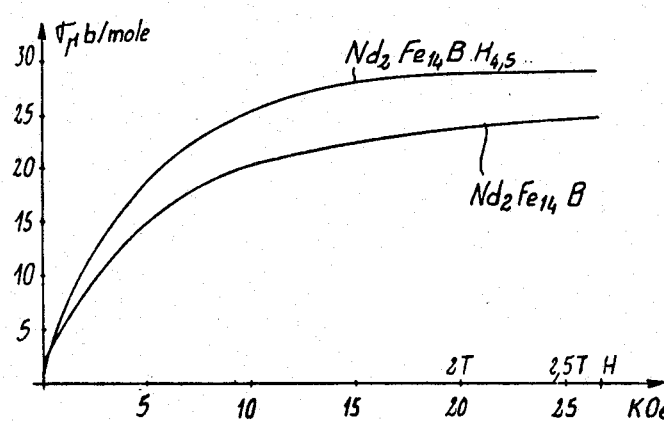

United States Patent [19]

Fruchart et al.

[11] Patent Number: 4,663,066
[45] Date of Patent: May 5, 1987

[54] MAGNETIC RARE EARTH/IRON/BORON AND RARE EARTH/COBALT/BORON HYDRIDES, THE PROCESS FOR THEIR MANUFACTURE OF THE CORRESPONDING PULVERULENT DEHYDROGENATED PRODUCTS

[75] Inventors: Robert Fruchart, La Tronche; Roland Madar, Eybens; Alain Rouault, Eybens; Philippe L'Heritier, Eybens; Pierre Taunier, Grenoble; Daniel Boursier, Meylan; Daniel Fruchart, Echirolles; Patrick Chaudouët, Grenoble, all of France

[73] Assignee: Centre National de la Recherche Scientifique, Paris, France

[21] Appl. No.: 746,360

[22] Filed: Jun. 19, 1985

[30] Foreign Application Priority Data

Jun. 29, 1984 [FR] France ................................ 84 10387

[51] Int. Cl.$^4$ ........................................... C01G 37/02
[52] U.S. Cl. .............................. 252/62.51; 252/62.55; 252/62.57; 252/62.58; 252/62.59; 148/302; 423/276; 420/900; 420/302; 420/83
[58] Field of Search .............. 75/122.1, 123 B, 123 E; 252/62.51, 62.55, 62.57, 62.58, 62.59; 148/31.57, 302; 423/276

[56] References Cited

FOREIGN PATENT DOCUMENTS 0101552 2/1984 European Pat. Off. .
0126179 11/1984 European Pat. Off. .

OTHER PUBLICATIONS

K. Oesterreicher and H. Oesterreicher, "Structure and Magnetic Properties of $Nd_2Fe_{14}BH_{2.7}$" Phys. Stat. Sol. (a) K61–K64.
Arthur L. Robinson, Science, "Powerful New Magnetic Material Found", pp. 920–922, vol. 223, Mar. 2, 1984.
L'Heritier et al., C. R. Acad. Sci. Ser. 2, 1984, vol. 299, No. 13, pp. 849–852.

Primary Examiner—John Doll
Assistant Examiner—Jackson Leeds
Attorney, Agent, or Firm—Ladas & Parry

[57] ABSTRACT

New magnetic hydride $Nd_2Fe_{14}BH_x$ ($0<x<5$) and family corresponding to other rare earths and yttrium. Possible substitution of Fe by Co. Preparation from $Nd_2Fe_{14}B$ by hydrogenation (ambient temperature; $pH_2>20$ bar), which can be reversed to give powdered $Nd_2Fe_{14}B$. Remarkable magnetic properties.

8 Claims, 4 Drawing Figures

MAGNETIC RARE EARTH/IRON/BORON AND RARE EARTH/COBALT/BORON HYDRIDES, THE PROCESS FOR THEIR MANUFACTURE OF THE CORRESPONDING PULVERULENT DEHYDROGENATED PRODUCTS

The present invention relates to the technical sector of products possessing permanent magnetic properties.

More particularly, the invention relates to hydrogenated products of the rear earth/iron/boron type and to the preparation of the pulverulent products resulting from the corresponding hydrogenation/hydrogenation cycle.

An interesting point on permanent magnets containing a rare earth element and on the current researches in this field was raised in the article by Arthur L. ROBINSON, SCIENCE, Volume 223, 2nd March 1984, pages 920–922, entitled "Powerful New Magnet Material Found".

The article in question describes, inter alia, a magnetic product of the formula $Nd_2Fe_{14}B$ together with its supposed crystal structure and its magnetic properties.

However, this product has a relatively low Curie point (585 K.).

According to the invention, a hydrogenation/dehydrogenation cycle for rear earth/iron/boron and rare earth/cobalt/boron compounds has now been discovered which produces novel hydrides possessing remarkable magnetic properties and corresponding to the formula:

$$R_2Fe_{14}BH_x$$

or $$R_2Co_{14}BH_x$$

where $0 < x \leq 5$, preferably $x \geq 0.1$, in which R represents a rare earth element or yttrium and in which, in the above formula, the iron or cobalt can be partially substituted by other 3d, 4d and 5d transition elements or elements such as Al, Si, C and Ge.

In fact, the magnetic moment of these compounds is distinctly greater than that of the respective non-hydrogenated compounds.

The invention therefore also relates to the application of the abovementioned compounds utilizing their magnetic properties. These compounds prove particularly valuable in the form of fine powder, in particular for the preparation of magnetic reading and recording media and of ferrofluids and for incorporation into elastomeric or plastic compositions and the like.

The invention also relates to a process for the preparation of the abovementioned compounds, which consists in hydrogenating the rare earth/iron/boron or rare earth/cobalt/boron compounds at ambient temperature and under a suitable hydrogen pressure. The hydrogen pressure is adapted according to the compound and the desired degree of hydrogenation. For example, a pressure above 10 bar ($10 \times 10^5$ Pa) and below 500 bar ($500 \times 10^5$ Pa) has proved satisfactory.

The compounds can be dehydrogenated by heating to a temperature preferably of between 150° and 600° C. However, care must be taken not to reach the decomposition point of the said compounds. Thus, the intermediates in which $0 < x < 5$ are obtained by mixing a non-hydrogenated compound with a compound of degree of hydrogenation $x=5$ in the desired proportions, after which this mixture is heated to the appropriate dehydrogenation temperature in a leaktight enclosure which has the smallest possible dead volume and is capable of withstanding pressure. The hydrogenation is preferently carried out under vacuum.

After cooling, a homogeneous hydride is obtained which is characterized by a fine line spectrum and whose Curie point and crystal parameters are between the extreme values characteristic of the product on the one hand and the hydrogenated product on the other.

The hydrogenation/dehydrogenation process also makes it possible to obtain a remarkable dehydrogenated product having the appearance of a fine powder. It must be emphasized that it was previously impossible to obtain such a product; moreover, it is known how important this fineness is in the abovementioned applications. In general, these products have, in combination with a grinding, a particle size of between 0.5 and 3 μm and preferably of between 0.8 and 1.5 μm.

The invention also relates to new non-hydrogenated compounds having a particle size of between 0.5 and 3 μm. Preferably, the compounds have a degree of hydrogenation $x \geq 3$ because they possess excellent magnetic moments for the applications envisaged.

Among the preferred compounds, there may be mentioned the compounds of the formula $Nd_2Fe_{14}BH_x$ where $0 < x \leq 5$. This new hydride is prepared by hydrogenation of the compound $Nd_2Fe_{14}B$. The hydrogenation is carried out at ambient temperature and under a hydrogen pressure of about 20 bar ($20 \times 10^5$ Pa), for example.

This process gives a compound corresponding to the formula $Nd_2Fe_{14}BH_5$, which is characterized by a tetragonal crystal cell having the following parameters:

a = 0.8926 nm
b = 1.2334 nm and whose Curie point is 403° C., $\theta_c = 403°$ C.

The starting material of the formula $Nd_2Fe_{14}B$ is itself obtained by a process similar to that described by SAGAWA in European Patent Application 0 101 552, following melting in a floating crucible and annealing operations. In view of the incongruent melting of the compound $Nd_2Fe_{14}B$, enrichment in neodymium relative to the stoichiometric composition makes it possible, by lowering the liquidus-solidus equilibrium temperature, to avoid the primary precipitation of iron during solidification. For this reason, a mixture corresponding to the overall composition $Nd_2Fe_{10.5}B$ will be used. The material thus obtained is composed very largely of the phase $Nd_2Fe_{14}B$ having the following parameters:

| tetragonal symmetry | a = 0.8805 nm | $\theta_c = 316°$ C. |
|---|---|---|
| | c = 1.2204 nm | |

The magnetic moments, expressed in uemcgs, are respectively as follows:

(1) $Nd_2Fe_{14}B$ obtained from the initial composition "$Nd_2Fe_{10.5}B$", having the following parameters:

| a = 0.8805 nm | |
|---|---|
| c = 1.2204 nm | |
| H = 2.66 Tesla (300 K) | M = 129.2 uemcgs |
| H = 15.8 Tesla (4.2 K) | M = 164.6 uemcgs |
| H = 15.8 Tesla (300 K) | M = 144.3 uemcgs. |

(2) The above compound hydrogenated, having the parameters:

| | |
|---|---|
| a = 0.8926 nm | |
| c = 1.2334 nm | |
| H = 2.66 Tesla (300 K) | M = 150.8 uemcgs |
| H = 15.8 Tesla (4.2 K) | M = 169.4 uemcgs |
| H = 15.8 Tesla (300 K) | M = 152.4 uemcgs. |

Let it be emphasized that it was not at all obvious that a product containing such a high proportion of iron would be capable of being hydrogenated.

It was also feared that hydrogenation might affect (or decompose) the $Nd_2Fe_{14}B$ phase and hence the magnetic properties.

In actual fact, it was found that this was not the case at all and that, on the contrary, the absorption of hydrogen resulted in an increase in the magnetic moment at ambient temperature and a decrease in the magnetic field necessary to reach saturation, relative to the starting compound $Nd_2Fe_{14}B$, and in an increase in the Curie point.

This change in properties is shown in the attached FIG. 1.

The magnetic moment measured from 0 to 2.66 Tesla is expressed in $\mu_B$ per gram formula.

Figure 2:
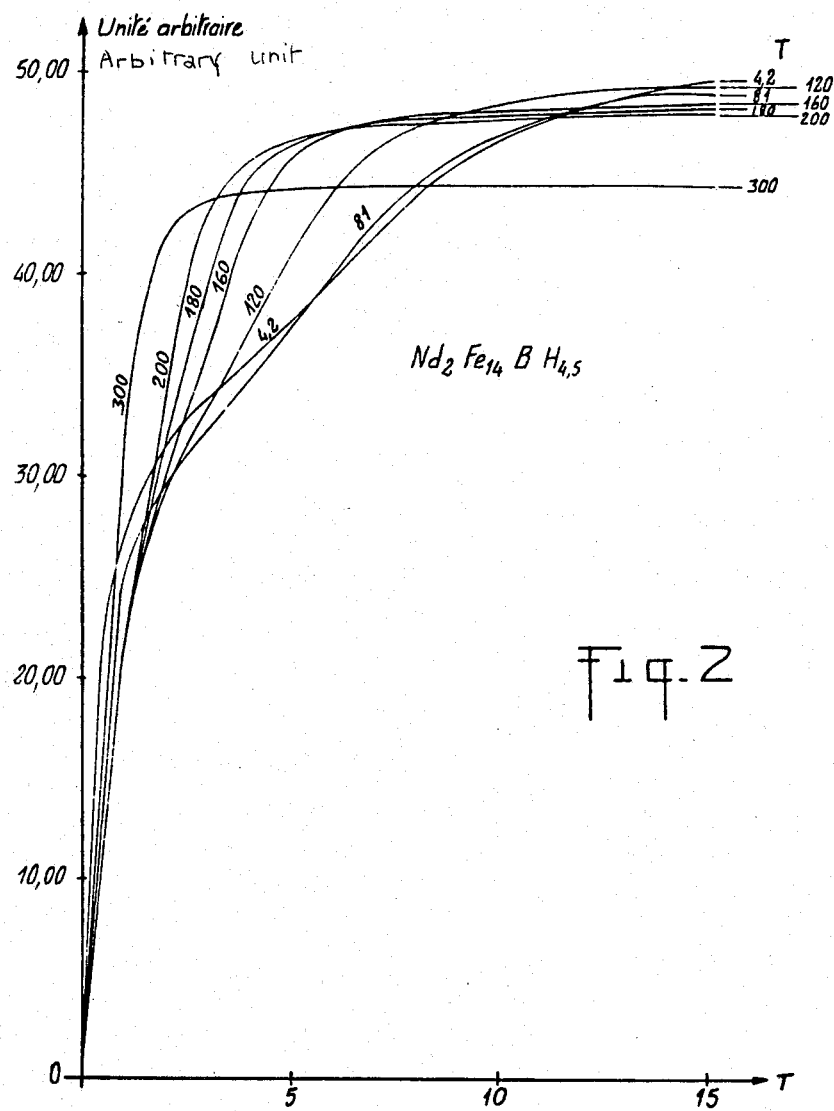

The attached FIG. 2 shows the magnetization curve, at the various temperatures indicated on the graph, of an $Nd_2Fe_{14}BH_5$ powder orientated perpendicularly to the field and immobilized under Araldite adhesive.

On this graph, the temperatures are expressed in degrees K. and the magnetic fields in Tesla.

This graph shows that the anisotropy field is very strong at low temperature. It decreases with increasing temperature.

The results of the magnetic study are confirmed by Mössbauer spectroscopy, which made it possible to demonstrate an increase in the hyperfine fields at the Fe sites at ambient temperature, relative to those measured for $Nd_2Fe_{14}B$.

At the four Fe sites distinguished by the Mössbauer effect, the weighted average hyperfine field changes from 305 kOe for $Nd_2Fe_{14}B$ to 320 kOe for the hydride $Nd_2Fe_{14}BH_x$ according to the invention.

It should be noted that the hydrogenation described above can be reversed without destroying the $Nd_2Fe_{14}B$ phase and that the hydrogenation/dehydrogenation cycle applied to the compound $Nd_2Fe_{14}B$ makes it possible to prepare this compound $Nd_2Fe_{14}B$ in a pulverulent form.

At atmospheric pressure, the hydride starts to lose its hydrogen at about 150° C. Nevertheless, temperatures of the order of about 400° C. are necessary in order to remove all the hydrogen under fore-vacuum ($10^{-2}$ mm Hg) and to return to the starting compound $Nd_2Fe_{14}B$.

The incongruent melting of some $R_2Fe_{14}B$ compounds, in particular $Nd_2Fe_{14}B$, does not allow a pure product to be obtained by melting and solidification of a mixture of the elements in stoichiometric proportions. The material obtained is a mixture comprising a very major proportion of the $Nd_2Fe_{14}B$ phase, iron and a compound much richer in neodymium (non-magnetic).

If the above mixture in massive form is subjected to a hydrogenation/dehydrogenation treatment, it becomes much more reactive because it is reduced to a fine powder. A diffusion treatment of the above pulverulent product at about 900° C. makes it possible to combine the iron produced by the primary precipitation and thus to obtain a much purer material.

The property of forming ferromagnetic hydrides is common to all the compounds isomorphous with the tetragonal compound $Nd_2Fe_{14}B$, including their solid solutions obtained either by substitution of the rare earths by other rare earths or by partial substitution of the iron and cobalt by 3d, 4d or 5d transition elements and various elements recognized as substituents for iron, such as Al, Si and Ge.

This substitution for iron is total in the case of cobalt, leading, for example, to the compound:

| | | |
|---|---|---|
| $Nd_2Co_{14}B$ | $\theta_c = 708°$ C. | a = 0.86492 nm |
| | | c = 1.18558 nm, | the hydrogenation of which can lead to the ferromagnetic formula:

| | |
|---|---|
| $Nd_2Co_{14}BH_3$ | a = 0.8705 nm |
| | c = 1.1925 nm. |

Tables I and II below collate the crystal parameters of a few preferred compounds according to the invention, hydrogenated at ambient temperature and under a hydrogen pressure of the order of 50 bar ($50 \cdot 10^5$ Pa), and the corresponding non-hydrogenated compounds.

ADDITIONAL EXAMPLES

The following products were prepared by the above methods:

(1) $Tb_2Co_{14}BH$
  % by weight of hydrogen fixed: 0.37%
(2) $La_2Co_{14}BH$
  % by weight of hydrogen fixed: 0.20%
(3) $Pr_2Co_{14}BH$
  % by weight of hydrogen fixed: 0.15%
(4) $Gd_2Co_{14}BH$
  % by weight of hydrogen fixed: 0.15%
(5) $Y_2Co_9Mn_5BH$
  % by weight of hydrogen fixed: 0.33%
  non-hydrogenated product ($Y_2Co_9Mn_5B$):
  a = 0.8697 nm
  c = 1.1969 nm.

TABLE I

| Ln | $Ln_2 Fe_{14} B$ | | | $Ln_2 Fe_{14} BH_x$ | | | H % ponderal | x |
|---|---|---|---|---|---|---|---|---|
| | nm | nm | nm³ | nm | nm | nm³ | | |
| Ce | a: 0,8757 | c: 1,2106 | v: 0,928351 | a: 0,8921 | c: 1,2275 | v: 0,977046 | 0,45 | 4,83 |
| Pr | 0,8810 | 1,2246 | 0,950542 | 0,8923 | 1,2370 | 0,985761 | 0,32 | 3,44 |
| Nd | 0,8805 | 1,2204 | 0,946189 | 0,8926 | 1,2344 | 0,983489 | 0,47 | 5,08 |
| Sm | 0,8791 | 1,2135 | 0,937940 | 0,8919 | 1,2263 | 0,975597 | 0,37 | 4,05 |
| Gd | 0,8789 | 1,2077 | 0,932892 | 0,8891 | 1,2201 | 0,964410 | 0,29 | 3,22 |
| Tb | 0,8767 | 1,2040 | 0,925471 | 0,8879 | 1,2168 | 0,959398 | 0,32 | 3,56 |
| Dy | 0,8759 | 1,2011 | 0,921621 | 0,8866 | 1,2139 | 0,954176 | 0,32 | 3,58 |
| Ho | 0,8745 | 1,1977 | 0,915715 | 0,8853 | 1,2114 | 0,949397 | 0,39 | 4,39 |
| Er | 0,8734 | 1,1956 | 0,912059 | 0,8844 | 1,2088 | 0,945570 | 0,30 | 3,39 |

TABLE I-continued

| Ln | Ln₂Fe₁₄B | | | Ln₂Fe₁₄BH_x | | | H % ponderal | x |
|----|----|----|----|----|----|----|----|----|
|    | nm | nm | nm³ | nm | nm | nm³ | | |
| Tm | 0,8722 | 1,1931 | 0,907715 | 0,8840 | 1,2061 | 0,942423 | 0,30 | 3,39 |
| Y  | 0,8755 | 1,2018 | 0,921256 | 0,8880 | 1,2156 | 0,958534 | 0,38 | 3,7 |

TABLE II

| Ln | Ln₂Co₁₄B | | | Ln₂Co₁₄BH_x | | | H % ponderal | x |
|----|----|----|----|----|----|----|----|----|
|    | nm | nm | nm³ | nm | nm | nm³ | | |
| La | a: 0,8687 | c: 1,1012 | v: 0,906573 | a: 0,8752 | c: 1,2087 | v: 0,925786 | 0,20 | 2,14 |
| Pr | 0,8655 | 1,1886 | 0,890383 | 0,8712 | 1,1965 | 0,908237 | 0,14 | 1,5 |
| Nd | 0,8649 | 1,1856 | 0,886916 | 0,8705 | 1,1925 | 0,903602 | 0,27 | 2,9 |
| Sm | 0,8629 | 1,1806 | 0,879220 | 0,8678 | 1,1878 | 0,894649 | 0,16 | 1,75 |
| Gd | 0,8618 | 1,1764 | 0,873813 | 0,8655 | 1,1809 | 0,884656 | 0,15 | 1,77 |
| Tb | 0,8605 | 1,1728 | 0,868511 | 0,8637 | 1,1764 | 0,877631 | 0,37 | 4,1 |
| Y  | 0,8604 | 1,1718 | 0,867532 | 0,8635 | 1,1758 | 0,876772 | 0,42 | 4,25 |

Figure 3:
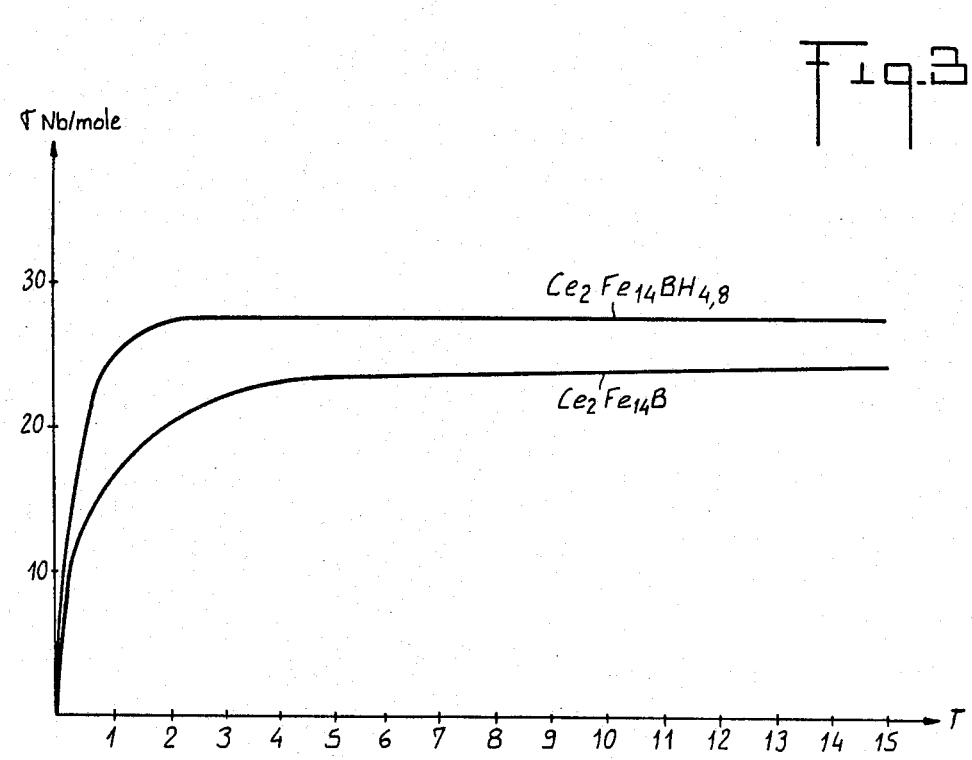

FIG. 3 shows the magnetization curves at 293 K. of the compounds $Ce_2Fe_{14}BH_{4.83}$ and $Ce_2Fe_{14}B$.

Figure 4:
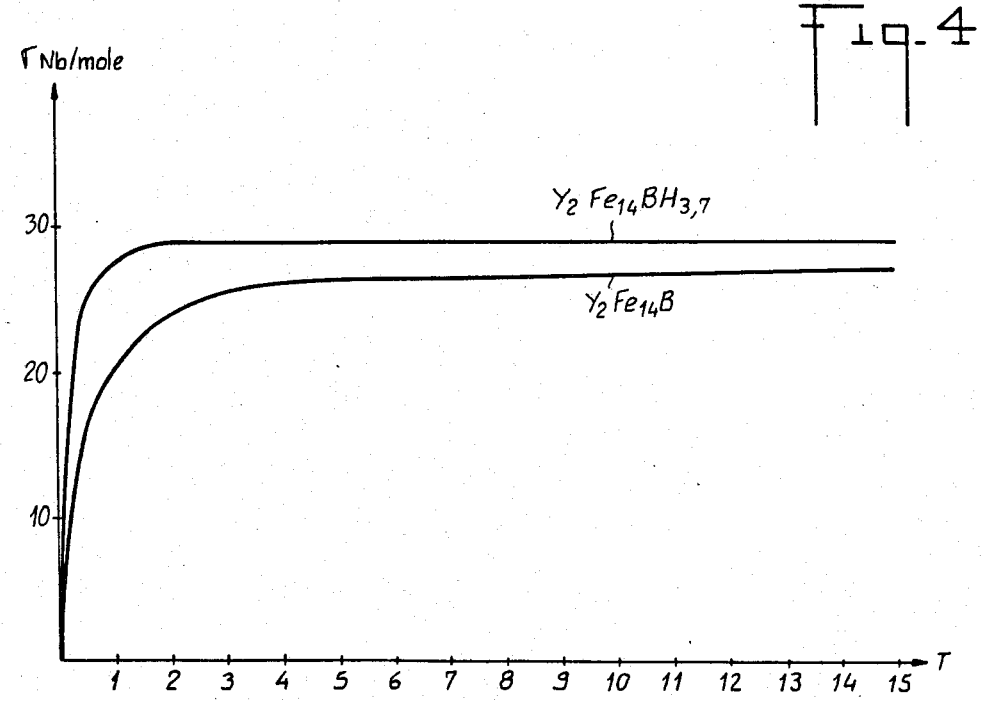

Likewise, FIG. 4 shows the magnetization curves at 293 K. of the compounds $Y_2Fe_{14}BH_{3.7}$ and $Y_2Fe_{14}B$.

In both these cases, a very high magnetization value was found, with a lower anisotropy.

What is claimed is:

1. A compound which comprises a rare earth/iron/boron or rare earth/cobalt/boron hydride and corresponds to the formula:

$$R_2Fe_{14}BH_x$$

or $$R_2Co_{14}BH_x$$

where $0 < x \leq 5$,
in which R represents a rare earth element or yttrium, and wherein, in the above formula, the iron or cobalt can be partially substituted by an element selected from the group consisting of 3d, 4d and 5d transition elements Al, Si, C and Ge.

2. A compound as claimed in claim 1, which corresponds to the formula:

$$Nd_2Fe_{14}BH_x$$

or $$Nd_2Co_{14}BH_x$$

where $0 < x \leq 5$.

3. A process for the preparation of the compounds as claimed in claim 1, which comprises hydrogentating the rare earth/iron/boron compound $R_2Fe_{14}B$ or the rare earth/cobalt/boron compound $R_2Co_{14}B$.

4. The process as claimed in claim 3, wherein said compounds are hydrogenated at ambient temperature and under a hydrogen pressure of at least $1 \cdot 10^6$ Pa and below $500 \cdot 10^5$ Pa.

5. A process for the dehydrogenation of compounds of the formula $R_2Co_{14}BH_x$ or $R_2Fe_{14}BH_x$ as claimed in claim 1, which comprises heating these compounds to between 150° and 600° C.

6. A compound as claimed in claim 1, which corresponds to $Nd_2Fe_{14}BH_5$.

7. A compound as claimed in claim 1, which corresponds to $Nd_2Co_{14}BH_3$.

8. A compound, as in claim 1, which is in the form of a fine powder.

* * * * *